UNITED STATES PATENT OFFICE.

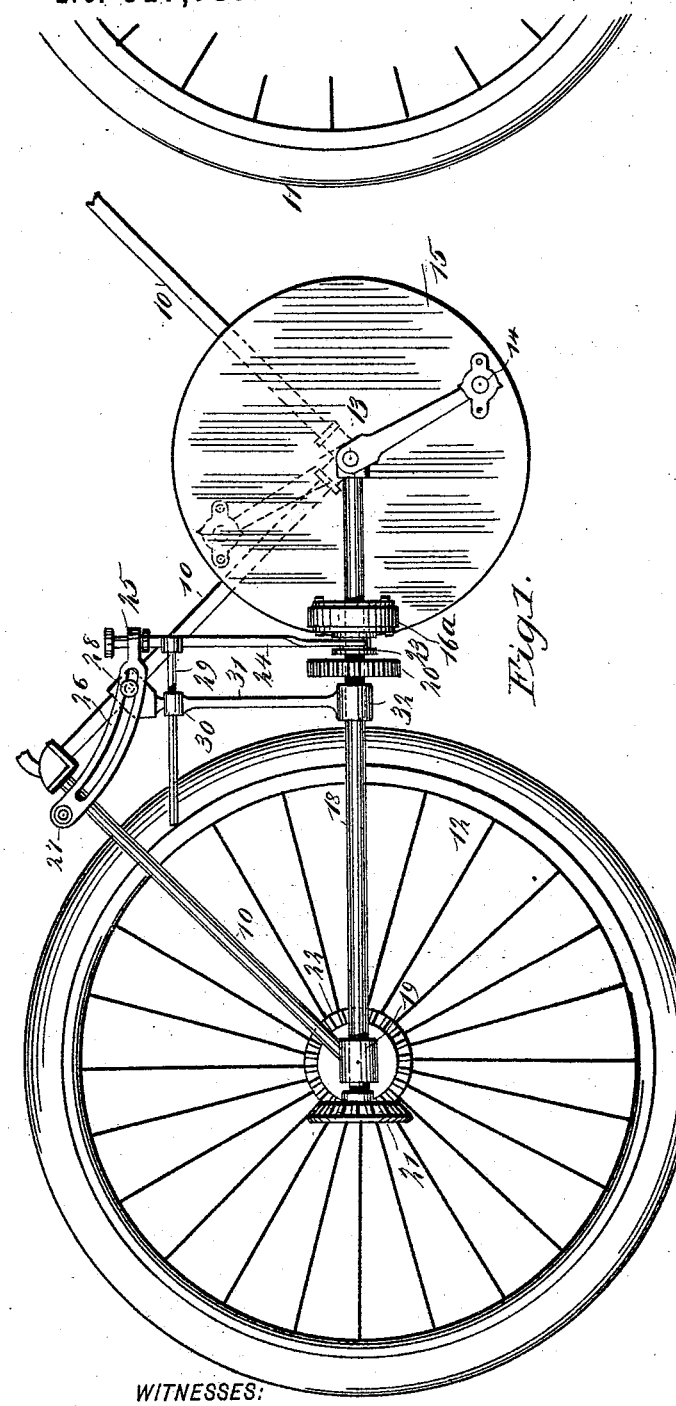

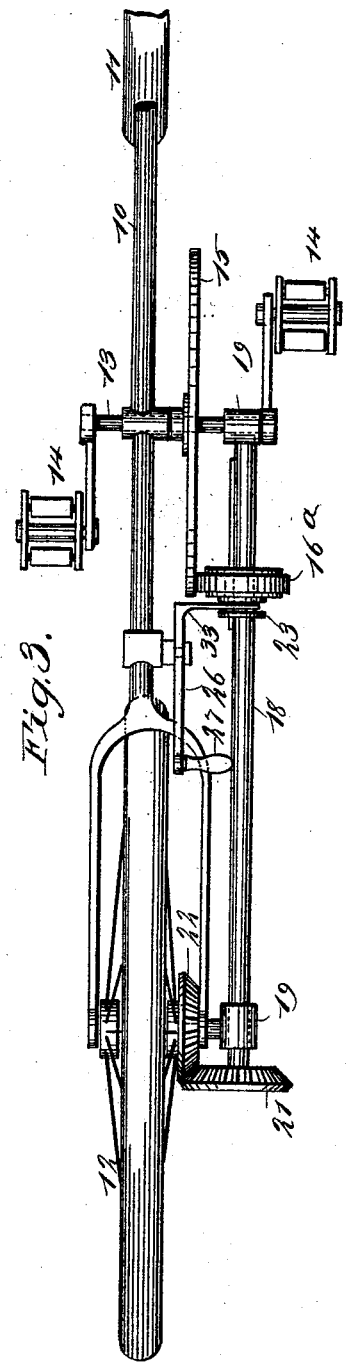

SAMUEL CHARLES EISENHART, OF YORK, PENNSYLVANIA.

VARIABLE DRIVING-GEAR FOR BICYCLES.

SPECIFICATION forming part of Letters Patent No. 517,739, dated April 3, 1894.

Application filed September 30, 1893. Serial No. 486,851. (No model.)

*To all whom it may concern:*

Be it known that I, SAMUEL CHARLES EISENHART, of York, in the county of York and State of Pennsylvania, have invented a new and Improved Variable Driving-Gear for Bicycles, of which the following is a full, clear, and exact description.

My invention relates to improvements in variable driving mechanism for bicycles; and consists of certain features of construction and combinations of parts, as will be hereinafter described and claimed.

Reference is to be had to the accompanying drawings, forming a part of this specification, in which similar figures of reference indicate corresponding parts in all the views.

Figure 1 is a broken side elevation of a safety bicycle provided with my improved driving gear. Fig. 2 is a plan view of the same, and Fig. 3 is a broken plan view of a modified form of the driving gear in which one of the friction rollers and shafts shown in Figs. 1 and 2 are dispensed with.

The machine is provided with a suitable frame 10 which may be of any approved construction, and this is mounted on the front and rear wheels 11 and 12 in the usual manner, and the frame has also the customary pedal shaft 13 operated by the usual cranks and pedals 14. On the pedal shaft is secured a friction disk 15 which may be a plain disk or may have its sides covered with some such material as rubber or leather to give it more adhesion, and this disk is clasped by friction rollers 16 and 16ᵃ to which it imparts motion, and these rollers are slidable in relation to the axis of the friction disk and are keyed to shafts 17 and 18 so as to slide on the shafts and turn therewith, and these shafts 17 and 18 are supported in suitable ball bearings 19 of common construction, which bearings are carried by the main frame. The shafts 17 and 18 are connected by meshing gear wheels 20, so that the power may be taken from both sides of the friction disk 15 and applied to the shaft 18 which serves as a driving shaft, and this shaft is longer than the shaft 17, extending backward to a point adjacent to the hub of the rear wheel 12, with which wheel it connects by means of the beveled gear wheels 21 and 22, one being secured to the shaft and the other to the wheel hub. The friction rollers 16 and 16ᵃ are provided with the usual grooved hubs 23 in which fit the prongs of the fork 24, which fork extends upward at the side of the frame 10 and to it is coupled, as shown at 25, the longitudinally slotted plate 26 which extends rearwardly and upwardly and has, at its rear end, a handle 27 which is within easy reach of the saddle and may be grasped to move the plate and fork. The plate 26 rides on a flanged guide roller 28, which is held in the slot of the plate and is fulcrumed on a suitable support on one side of the frame 10, and the fork 24 is further guided and braced by a guide bar 29 which is secured to the fork and slides in a bearing or sleeve 30 at the upper end of a post 31, which post has its feet 32 journaled on the shafts 17 and 18.

The construction above described affords a convenient means of guiding and moving the fork 24, and the friction rollers 16 and 16ᵃ. It will be observed that when the friction rollers are moved to a point near the hub of the disk 15, they will be moved comparatively slowly and the machine will be driven with great power, but as they are moved toward the circumference of the disk their speed increases, owing to the increased speed of the part of the disk with which they come in contact and consequently the bicycle will be driven with greater speed without changing the speed of the pedal shaft. The friction rollers 16 and 16ᵃ are moved on the shaft by grasping the handle 27 and pushing the plate 26 and fork 24 backward or forward as desired.

The construction above described, including two friction rollers, is my preferred form of driving gear, but if desired, a lighter driving gear may be used in which one friction roller is employed, as shown in Fig. 3. In this construction the shaft 17 and the roller 16 are dispensed with and power is transmitted from one side only of the friction disk 15 to the driving shaft 18. A single fork 33 is used for shifting the position of the friction roller with relation to the friction disk, and this fork may be actuated by the slide plate 26 and handle 27, as already described.

I have shown and described my improved driving gear as applied to safety bicycles, the use for which it is chiefly intended, but it will be seen that the driving gear may be used for propelling other kinds of bicycles.

Having thus described my invention, I claim as new and desire to secure by Letters Patent—

1. The combination with a bicycle, of a friction disk carried by the pedal shaft, a driving shaft adjacent to the friction disk, a friction roller adjustable on the driving shaft, an operative driving connection between the shaft and the rear bicycle wheel, a fork engaging the hub of the roller, a handle plate connected with the fork and held to run on a guide roller, and a guide rod secured to the fork and adapted to slide in an adjacent support, substantially as described.

2. The combination, with the friction disk, the parallel shafts adjacent to it and the friction rollers on the shafts, of a fork engaging the hubs of the rollers, a handle plate connected with the fork and held to run on a guide roller, and a guide rod secured to the fork and adapted to slide in an adjacent support, substantially as described.

SAMUEL CHARLES EISENHART.

Witnesses:
G. W. AUGHENBAUGH,
KATIE AUGHENBAUGH.